United States Patent [19]
Miyauchi et al.

[11] 3,859,873
[45] Jan. 14, 1975

[54] LINE PRESSURE MODULATING DEVICE FOR AN AUTOMATIC POWER TRANSMISSION

[75] Inventors: Toshiyuki Miyauchi; Kunio Ohtsuka, both of Yokohama, Japan

[73] Assignee: Nissan Motor Company, Limited, Yokohama City, Japan

[22] Filed: Aug. 23, 1973

[21] Appl. No.: 390,853

[30] Foreign Application Priority Data
Aug. 24, 1972   Japan.............................. 47-84047

[52] U.S. Cl.......................... 74/867, 74/865, 74/868
[51] Int. Cl....................... B60k 17/10, C05g 19/00
[58] Field of Search .............. 74/866, 867, 868, 869

[56] References Cited
UNITED STATES PATENTS

| | | | |
|---|---|---|---|
| 3,561,295 | 2/1971 | Iijima.................................... | 74/869 |
| 3,583,259 | 6/1971 | Shimosaki......................... | 74/869 X |
| 3,656,373 | 4/1972 | Shimosaki............................ | 74/869 |
| 3,710,652 | 1/1973 | Miyazaki...................... | 74/869 X |
| 3,726,157 | 4/1973 | Marumo .......................... | 74/866 X |
| 3,744,348 | 7/1973 | Lemon................................. | 74/869 |

Primary Examiner—Benjamin W. Wyche
Assistant Examiner—Lance W. Chandler

[57] ABSTRACT

A line pressure modulating device for use with a hydraulic control system of an automatic power transmission, which device reduces line pressure when a motor vehicle remains at standstill for thereby minimizing shifting shock that would otherwise occur during shifting from neutral to automatic forward drive or reverse drive ranges. The line pressure modulating device includes first and second control valves which cooperates with each other to pass line pressure as a signal pressure to a line pressure regulator valve to move the same in a position to decrease line pressure when an accelerator pedal is released while the motor vehicle remains at standstill.

6 Claims, 4 Drawing Figures

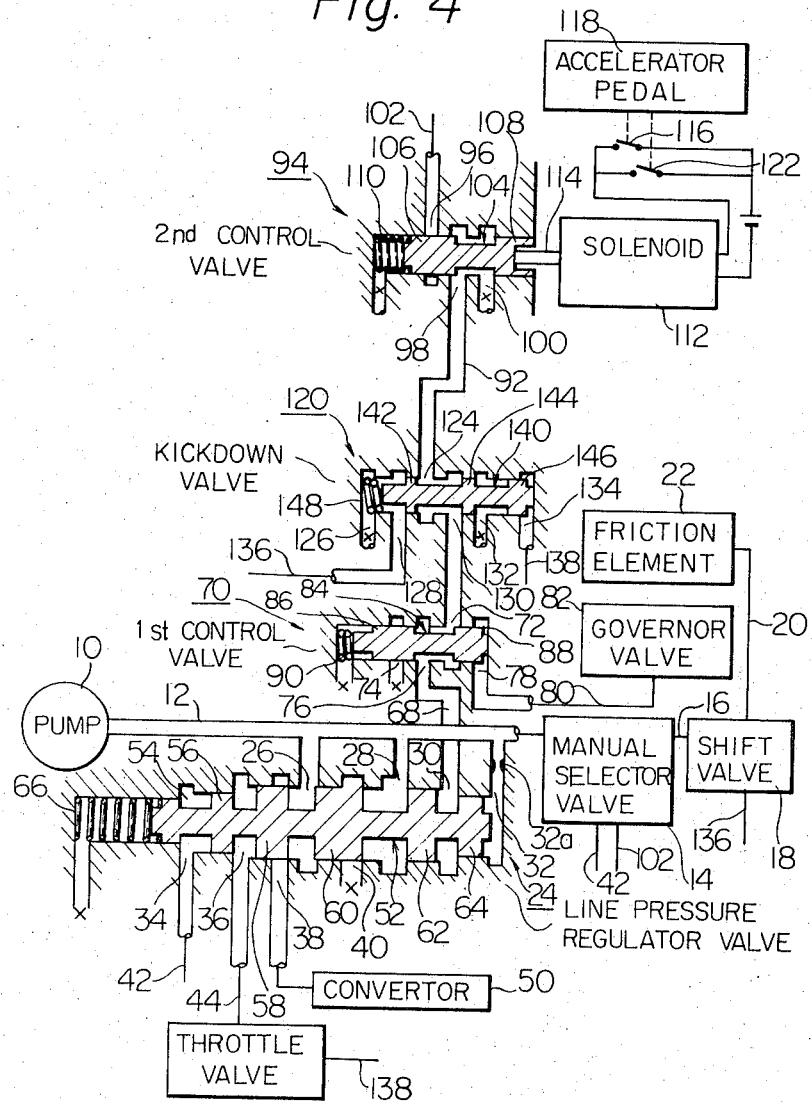

LINE PRESSURE MODULATING DEVICE FOR AN AUTOMATIC POWER TRANSMISSION

This invention relates in general to hydraulic control systems for automatic power transmissions of motor vehicles and, more particularly, to a line pressure modulating device for use in a hydraulic control system to prevent a shock from occurring during a gear change when a vehicle is not moving.

It is well known that an automatic power transmission of a motor vehicle is equipped with a hydraulic control system which controls supply of fluid under pressure to various fluid pressure operated actuators for friction elements such as clutches and brakes. This fluid pressure will be referred to as line pressure hereinafter. A conventional hydraulic control system is usually so arranged as to vary the line pressure in proportion to the engine output torque to vary the clutch and brake engaging force of the power transmission in accordance therewith. Thus, the line pressure is at a high level as the motor vehicle is set into motion. Accordingly, if the selector lever of the power transmission is shifted from neutral (N) to automatic drive (D) or reverse drive (R), the clutch or brake is coupled with excessive force. Thus, the present invention contemplates to reduce the line pressure to an appropriate level to provide desired clutch and brake engagement to eliminate a shock that would otherwise occur during shifting from the (N) to the (D) or (R) gear position before the vehicle is set into motion.

It is, therefore, an object of the present invention to provide, in a hydraulic transmission control system for a motor vehicle, a modulating device for varying the engaging force of control system actuators to promote smooth gear shifting while the vehicle is not moving.

Another object of the present invention is to provide a line pressure modulating device for use in a hydraulic control system of an automatic power transmission of a motor vehicle which modulates the line pressure to a value to prevent shocks from occurring during gear shifting while the vehicle is not moving.

Another object of the present invention is to provide a line pressure modulating device for an automatic power transmission of a motor vehicle which varies the line pressure in accordance with the position of an accelerator pedal to produce smooth shifting from a neutral position to an automatic drive or reverse drive position while the vehicle is not moving.

Still another object of the present invention is to provide a line pressure modulating device for an automatic power transmission of a motor vehicle which detects if the motor vehicle is at a standstill and the position of an accelerator pedal of the motor vehicle to reduce the line pressure to decrease the engaging force of a clutch or brake of the power transmission to produce smooth shifting of transmission gears if the vehicle is stationary and the accelerator pedal is not depressed.

A further object of the present invention is to provide a line pressure modulating device for an automatic power transmission of a motor vehicle which comprises a minimum number of component parts and is simple in construction and economical to manufacture.

A still further object of the present invention is to provide a line pressure modulating device which can be readily installed in an existing hydraulic control system for an automatic power transmission commonly employed in a motor vehicle.

In order to achieve these and other objects, the present invention provides a line pressure modulating device for an automatic power transmission of a motor vehicle. In a preferred embodiment, the line pressure modulating device is arranged to sense the position of an accelerator pedal and detect if the motor vehicle is at a standstill to modulate the line pressure in dependence thereon. If the accelerator pedal is not depressed (released), a solenoid is energized to actuate a second control valve cooperating therewith to apply fluid pressure to a first control valve which permits pressure to be transmitted to a line pressure regulator valve when the motor vehicle is at standstill so that the line pressure regulator valve is actuated to reduce the line pressure. If, on the contrary, the accelerator pedal is depressed, the solenoid is de-energized so that the pressure to the line pressure regulator valve is inhibited. Thus, the line pressure regulator valve operates as usual, and the line pressure is maintained at a level sufficient to provide a desired engaging force for a transmission clutch or brake.

These and other objects and features of the present invention will become more apparent from the following description when taken in conjunction with the accompanying drawings, in which:

FIG. 4 is a view similar to FIG. 3 but shows a modified form of the line pressure modulating device of FIG. 3.

Figure 1:
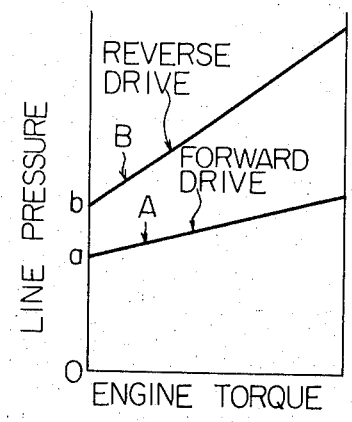
FIG. 1 is a graph illustrating line pressure as a function of engine output torque in a prior art hydraulic control system for an automatic power transmission.
Figure 2:
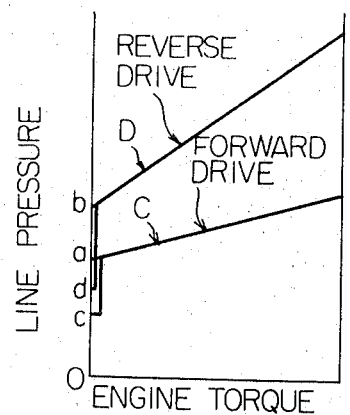
FIG. 2 is a graph illustrating line pressure as a function of engine output torque in a line pressure modulating device according to the present invention.

Referring now to FIG. 1, there is shown a graph illustrating line pressure as a function of engine output torque in a conventional hydraulic control system for an automatic power transmission. In FIG. 1, a curve A represents the line pressure during forward driving of the power transmission, whereas a curve B indicates line pressure during reverse driving of the power transmission. As seen from these curves A and B, the line pressure increases as the engine torque increases so that sufficient engaging force for a clutch or brake is obtained. If a manual selector valve of the hydraulic control system is shifted from a neutral (N) to an automatic forward drive (D) or reverse drive (R) position, the clutch or brake is coupled by line pressure at a level $a$ or $b$ respectively so that a shock will take place. Before the motor vehicle starts moving, no torque will be transmitted from the vehicle engine to the transmission output shaft even if the power transmission is shifted from a neutral to an automatic forward drive or reverse drive position. Thus, it is unnecessary to maintain the line pressure at the level $a$ or $b$. It is, therefore, desired that the line pressure be reduced to a level as low as possible to prevent a shock in the power transmission during gear shifting under this condition. The present invention proposes to modulate the line pressure in a manner as shown by a curve C or D in FIG. 2 so that the line pressure is reduced to a level lower than a level $c$ or $d$ in FIG. 2 while the motor vehicle is stationary, so that a shock in the power transmission will not occur.

Figure 3:
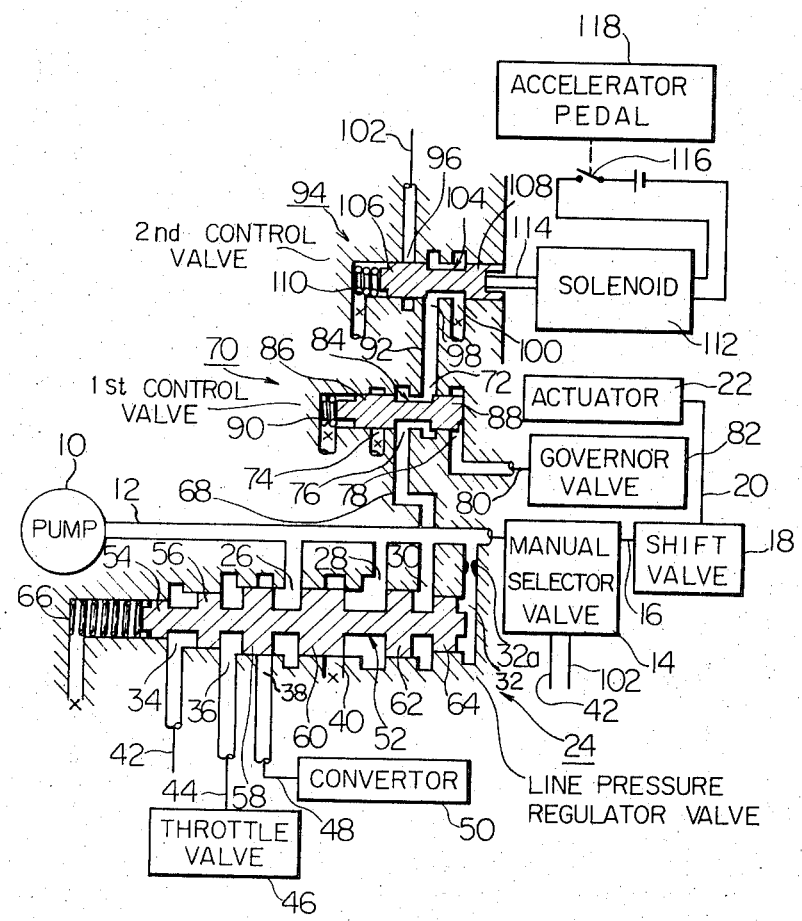
FIG. 3 is a schematic view of a preferred embodiment of a line pressure modulating device according to the present invention.

Referring now to FIG. 3, there is schematically shown a line pressure modulating device embodying the present invention, the device shown as being incorporated into a usual hydraulic control system of an automatic power transmission. The line pressure modulating device of the present invention comprises a source of line pressure such as a pump 10 which communicates through a line pressure conduit 12 with a manual selector valve 14 of the hydraulic control system.

The manual selector valve 14 has a plurality of shifting positions including neutral, automatic forward drive and reverse drive, though not shown, and is movable to the different shifting positions by a manual selector lever (not shown) in a usual manner. The manual selector valve 14 in turn communicates with a shift valve 18 through a conduit 16, which in turn communicates through a conduit 20 with a fluid pressure operated actuator 22 for a transmission friction element such as a brake or clutch (not shown). A circuit arrangement of a hydraulic control system is clearly disclosed in detail in U.S. Pat. No. 3,546,973 entitled "Hydraulic Control System for Automatic Power Transmission" and, therefore, a detailed description of the same is herein omitted for the sake of simplicity.

As shown in FIG. 3, the line pressure modulating device also comprises a line pressure regulator valve 24 which communicates through the conduit 12 with the pump 10. The line pressure regulator valve 24 has a plurality of ports 26, 34 and 38, and first second, third, fourth and fifth ports 32, 28, 36, 30 and 40 respectively. The port 26 serves as a first inlet which communicates through the conduit 12 with the pump 10. The port 28 also serves as an inlet which communicates with the conduit 12. The port 30 communicates with a control valve as will be described in detail. The port 32 has a flow restricting means or an orifice 32a therein, and also communicates with the line pressure conduit 12. The port 34 communicates through a conduit 42 with the manual selector valve 14 to receive line pressure therefrom when the manual selector valve 14 is moved to its reverse drive position. If desired the port 34 and conduit 42 may be omitted, in which case the curves C and D of FIG. 2 will coincide. The port 36 communicates through a conduit 44 with a throttle valve 46 to receive therefrom a throttle pressure representative of engine output torque. The throttle valve 46 may be of any suitable configuration such as disclosed in, for example, the above-mentioned Patent, and therefore a detailed description of the same in herein omitted. The port 38 communicates through a conduit 48 with a hydraulic torque converter 50 in a manner as disclosed in the Patent which has been described hereinabove. The port 40 serves as a drain at substantially ambient pressure.

The line pressure regulator valve 24 also has a first valve spool 52 having a valve land 54, and first, second, third, fourth and fifth valve lands 60, 64, 62, 56 and 58 respectively in a spaced relationship therewith. The valve land 54 is smaller in diameter than the valve land 56, which is smaller in diameter than the valve lands 58, 60 and 62 which have equal diameters. The valve land 64 is smaller in diameter than the valve land 62. The valve land 58 controls fluid communication between the ports 26 and 38, while the valve land 60 controls fluid communication between the ports 28 and 40 to modulate the line pressure in dependence on the position of the valve spool 52. The valve spool 52 thus configured is biased by a first compression spring 66 rightward as shown to cause the valve land 60 to block fluid communication between the ports 28 and 40 to maximize the level of line pressure.

The port 30 of the line pressure regulator valve 24 communicates through a conduit 68 with a first control valve 70. The first control valve 70 has a port 74, and sixth, seventh and eighth ports 72, 76 and 78 respectively. The ports 72 and 76 are selectively brought into fluid communication with each other in a manner which will be described hereinafter. The port 74 is a drain selectively communicable with the port 76. The port 76 communicates through the conduit 68 with the line pressure regulator valve 24. The port 78 communicates through a conduit 80 with a governor valve 82 to receive a governor pressure which is a function of the rotational speed of the transmission output shaft. The governor valve 82 is clearly disclosed in the above noted Patent, and a detailed description of the same is herein omitted. The governor valve 82 produces a governor pressure representative of the vehicle speed so that when the motor vehicle is at a standstill, the governor pressure is at a minimum level. Thus, the governor valve 82 serves as a first sensor to detect if the motor vehicle is at a standstill.

As shown, the first control valve 70 also has a first valve spool 84 including spaced sixth and seventh valve lands 86 and 88 respectively of same diameter, and a second compression spring 90 for biasing the valve spool 84 rightward as shown to establish fluid communication between the ports 72 and 76. The valve land 86 controls communication between the port 76 and the drain port 74, while the valve land 88 controls fluid communication between the ports 72 and 76. The valve land 88 is exposed to governor pressure from the port 78, so that when the governor pressure exceeds a first predetermined value, the valve spool 84 is moved leftward as shown to interrupt fluid communication between the ports 72 and 76 against the force of the compression spring 90. The port 72 of the first control valve 70 communicates through a conduit 92 with a second control valve 94.

The second control valve 94 has a port 100 and ninth and tenth ports 96 and 98 respectively. The port 96 communicates through a conduit 102 with the manual selector valve 14 so that line pressure can be selectively applied to the port 96 of the second control valve 94. The manual selector valve 14 is arranged to apply line pressure to the port 96 when in its neutral, forward drive, or reverse drive position. It applies line pressure to the port 34 when in its reverse drive position, and is adapted to apply line pressure to the port 34 before applying line pressure to the shift valve 18 during a shifting operation from neutral to reverse drive. This pressure is utilized for actuating the regulator valve 24 to cause the valve spool 52 thereof to move leftward as shown to decrease the level of line pressure as will be described in detail hereinafter. The port 98 communicates through the conduit 92 with the port 72 of the first control valve 70. The port 100 is a drain which is selectively communicable with the port 98.

The second control valve 94 also has a second valve spool 104 including a valve land 108 and an eighth valve land 106 in a spaced relationship therewith. The valve land 106 controls fluid communication between the ports 96 and 98, while the valve land 108 controls fluid communication between the ports 98 and 100. As shown, the valve spool 104 is biased by a third compression spring 110 rightward as shown to establish fluid communication between the ports 98 and 100 while interrupting fluid communication between the ports 96 and 98. The second control valve 94 cooperates with an electric actuating means such as a solenoid 112 having a plunger 114 engageable with the valve spool 104. The solenoid 112 is electrically connected to a first switch 116 and an electric power source (no numeral). The switch 116 is mechanically linked to an accelerator pedal 118. This switch 116 may be of any known configuration insofar as it closes when the accelerator pedal 118 is released. It should be noted that the switch 116 serves as a second sensor to detect if the vehicle is at a standstill.

With the arrangement described hereinabove, at a neutral gear position of the manual selector valve 14, the valve spool 52 of the line pressure regulator valve 24 is biased rightward as viewed in FIG. 3 by the action of the compression spring 66 and the force developed by the throttle pressure acting on the differential surface area between the valve lands 56 and 58. Since, however, the rightmost valve land 64 of the valve spool 52 is exposed to line pressure admitted at the port 32, the valve spool 52 is held at a position in which the force acting on the valve land 64 overcomes the differential surface area force between the valve lands 56 and 58 and the action of the compression spring 66. Under this condition, if the throttle pressure increases (the engine torque increases), the valve spool 52 is forced to move rightward as shown in FIG. 3 so that the degree of fluid communication between the port 28 and the drain 40 is decreased. Accordingly, the line pressure is increased to provide sufficient clutch and brake engaging force. In contrast, if the throttle pressure decreases (the engine torque decreases), the valve spool 52 is forced to move leftward as shown in FIG. 3 because the force developed by the line pressure acting on the valve land 64 overcomes the force of the compression spring 66 and the force developed by the throttle pressure acting on the differential area between the valve lands 56 and 58. It will thus be seen that the line pressure is varied in dependence on the throttle pressure at the port 36 of the line pressure regulator valve 24. As the manual selector valve 14 is moved to its reverse drive position, line pressure is applied to the port 34 of the line pressure regulator valve 24 through the conduit 42, and acts on the differential surface area between the valve lands 54 and 56 whereby the valve spool 52 is displaced rightward to increase the line pressure.

If the accelerator pedal 118 is released and the valve 14 is in its drive position, the switch 116 is closed so that the solenoid 112 is energized and the plunger 114 protrudes thereby moving the valve spool 104 leftward in FIG. 3 against the action of the compression spring 110. Consequently, the port 96 of the second control valve 94 is brought into fluid communication with the port 98, and line pressure is applied through the conduit 92 to the port 72 of the first control valve 70. If, the motor vehicle is at standstill, the pressure from the governor pressure valve 82 is at a minimum level, and the compression spring 90 moves the valve spool 84 rightward in FIG. 3. Thus, the port 72 is brought into fluid communication with the port 76, and line pressure is applied through the conduit 68 to the port 30 of the line pressure regulator valve 24. The line pressure thus applied to the port 30 acts on the differential area between the valve lands 62 and 64 so that the valve spool 52 is moved leftward against the force of the compression spring 66 and the force developed by the throttle pressure acting on the valve lands 56 and 58. As a result, the degree of fluid communication between the port 28 and the drain port 40 increases so that a greater amount of fluid under pressure is drained off through the drain port 40. Thus, the line pressure is reduced to a level proper for producing smooth coupling of the clutch or brake.

If the accelerator pedal 118 is released during cruising of the motor vehicle, line pressure is admitted to the port 72 of the first control valve 70 in a manner as previously described. However, the governor pressure from the governor pressure valve 82 acts on the valve land 88 of the valve spool 84 to develop a force sufficient to overcome the force of the compression spring 90. Thus, the valve spool 84 of the first control valve 70 is moved against the force of the compression spring 90 to a position in which fluid communication between the ports 72 and 76 is blocked. Accordingly, line pressure is not applied to the port 30 of the line pressure regulator valve 24. Under these circumstances, the valve spool 52 of the line pressure regulator valve 24 attains a position in which the line pressure acting on the valve land 64 is balanced against the force of the compression spring 66 and the throttle pressure acting on the valve lands 56 and 58, and the level of the line pressure is determined by these factors. It will thus be appreciated that during cruising of the motor vehicle, the level of line pressure varies in dependence on the throttle pressure applied to the port 36 of the line pressure regulator valve 24, or on the engine torque.

If the accelerator pedal 118 is depressed before the motor vehicle starts to move, the switch 116 opens and the solenoid 112 is de-energized so that the plunger 114 is caused to retract. Consequently, the valve spool 104 of the second control valve 94 is moved to a position as shown in FIG. 3 by the force of the compression spring 110, and the port 96 is blocked by the valve land 106 while the port 98 is brought into fluid communication with the drain port 100. Thus, line pressure is not applied to the port 30 of the line pressure regulator valve 24, and the line pressure regulator valve 24 will operate in a manner mentioned hereinabove.

Another preferred embodiment of a line pressure modulating device according to the present invention is illustrated in FIG. 4, in which like component parts are designated by the same reference numerals as those used in FIG. 3. In this illustrated embodiment, a kickdown valve 120 is interposed between the first and second control valves 70 and 94, a second switch 122 is electrically connected to the solenoid 112 in parallel with the switch 116.

The kickdown valve 120 has a plurality of ports 124, 126, 128, 130, 132 and 134. The port 124 communicates through the conduit 92 with the port 98 of the second control valve 94. The port 126 is a drain. The port 128 communicates with the shift valve 18 through a conduit 136, and supplies line pressure as kickdown pressure to the shift valve 18 when the port 128 is brought into fluid communication with the port 124. The port 130 communicates with the port 72 of the first control valve 70. The port 132 is a drain which is selectively communicable with the port 130. The port 134 communicates through a conduit 138 with the throttle valve 46 to receive therefrom throttle pressure. The kickdown valve 120 also has a valve spool 140 including spaced valve lands 142, 144 and 146. The valve land 142 controls fluid communication between the ports 124 and 128. The valve land 144 controls fluid communication between the ports 124 and 130 and between the ports 130 and 132. The valve land 146 is exposed to throttle pressure applied to the port 134 from the throttle valve 46. The valve spool 140 is biased by a fourth compression spring 148 rightward in FIG. 4 to establish fluid communication between the ports 124 and 130. It will thus be noted that the valve spool 140 of the kickdown valve 120 is normally held in a position to establish fluid communication between the ports 124 and 130 to transmit line pressure from the second control valve 94 to the first control valve 70.

It should be understood that the second switch 122 is of a type which is mechanically linked with the accelerator pedal 118 and which closes when the accelerator pedal 118 is depressed beyond a second predetermined valve to produce acceleration of the motor vehicle. When the switch 122 is closed, the solenoid 112 is energized so that the plunger 114 is caused to protrude thereby moving the valve spool 104 of the second control valve 94 leftward in FIG. 4. Consequently, the port 96 is brought into fluid communication with the port 98. Thus, line pressure from the port 96 is transmitted to the port 98, from which it is transmitted through the conduit 92 to the port 124 of the kickdown valve 120. Since the throttle pressure at the port 134 of the kickdown valve 120 reaches a high level if the accelerator pedal 118 is sharply depressed, the force developed by this throttle pressure acting on the valve land 146 overcomes the force of the compression spring 148 if the theottle pressure is above a third predetermined value thereby moving the valve spool 140 leftward in FIG. 4. Accordingly, the port 124 is brought into fluid communication with the port 128 thereby transmitting line pressure thereto, from which line pressure is transmitted to the shift valve 18 via the conduit 136. The shift valve 18 is then actuated to apply line pressure to the fluid pressure operated actuator 22 for the friction element to effect kickdown of the power transmission. During this operation, fluid communication between the first and second control valves 70 and 94 is blocked by the kickdown valve 120 so that sufficient line pressure is available for gear shifting. When, in contrast, the accelerator pedal 118 is released, the throttle pressure reaches a lower level so that the force developed by the throttle pressure acting on the valve land 146 is overcome by the force of the compression spring 148. Accordingly, the valve spool 140 is moved to a position shown in FIG. 4 in which the port 124 communicates with the port 130 so that fluid communication between the ports 124 and 128 is interrupted. It will thus be seen that the solenoid 112 cooperating with the second control valve 94 is utilized for effecting kickdown of the power transmission.

It will now be understood from the foregoing description that a line pressure modulating device of the present invention is capable of reducing the level of line pressure to be applied to a fluid pressure operated actuator for a transmission friction element when the motor vehicle is at a standstill, whereby smooth engagement of the friction element can be obtained before the motor vehicle is set into motion.

It will also be noted that a line pressure modulating device of the present invention advantageously incorporates therein a kickdown valve to effect kickdown of the power transmission when an accelerator pedal is sharply depressed.

It will further be appreciated that a line pressure modulating device of the present invention permits the use of a minimum number of component parts to provide a simple configuration and ease of manufacturing.

What is claimed is:

1. A line pressure modulating device for a hydraulic control system of an automatic power transmission of a motor vehicle having an accelerator pedal, the hydraulic control system having a manual selector valve communicating with a source of line pressure, a throttle valve transmitting a throttle pressure representative of the output torque of a vehicle engine, and a governor valve transmitting a governor pressure varying in dependence on the rotational speed of an output shaft of the automatic power transmission, said device comprising, in combination, a line pressure regulator valve communicating with said source of line pressure and responsive to said throttle pressure from said throttle valve for regulating the line pressure in dependence thereon, a first control valve communicating with said line pressure regulator valve and responsive to said governor pressure from said governor valve, a second control valve communicating with said first control valve and said manual selector valve to receive from said manual selector valve line pressure, an electric actuating means to actuate said second control valve, and a first switch electrically connected to said electric actuating means, said first switch being mechanically linked with said accelerator pedal to close when said accelerator pedal is released, said electric actuating means being energized when said first switch is closed for actuating said second control valve to cause the same to transmit line pressure from said manual selector valve to said first control valve, and said first control valve being movable to a position to transmit line pressure applied thereto to said line pressure regulator valve when said governor pressure is below a first predetermined level, whereby said line pressure regulator valve is movable to a position to decrease the level of line pressure when said accelerator pedal is released while the motor vehicle is at a standstill.

2. A line pressure modulating device as claimed in claim 1, in which said line pressure regulator valve has a first port communicating with said source of line pressure through a flow restricting means, a second port communicating with said source of line pressure, a third port communicating with said throttle valve to receive said throttle pressure therefrom, a fourth port communicating with said first control valve, and a fifth port through which fluid under pressure is drained off when said second port is brought into fluid communication with said fifth port, a first valve spool slidably movable within said line pressure regulator valve having a first valve land to control fluid communication between said second port and said fifth port, a second valve land exposed to line pressure from said first port, a third valve land adjacent to said second valve land having a diameter greater than that of said second valve land, said third and second valve lands being exposed to line pressure from said fourth port, and fourth and fifth lands said fourth land having a diameter less than that of said fifth land, said fourth and fifth lands being exposed to line pressure from said third port, and a first compression spring biasing said first valve spool in a direction to decrease the degree of fluid communication between said second port and said fifth port, said first valve spool being movable against the force of said first compression spring in another direction to increase the degree of fluid communication between said second port and said fifth port when line pressure is applied to said fourth port of said line pressure regulator valve, whereby line pressure is reduced when said accelerator pedal is released while the motor vehicle is at a standstill.

3. A line pressure modulating device as claimed in claim 2, in which said first control valve has a sixth port communicating with said second control valve, a seventh port communicating with said fourth port of said line pressure regulator valve, and an eighth port communicating with said governor valve to receive therefrom governor pressure, a second valve spool having a sixth valve land to control communication between said seventh and eighth ports, said second valve spool having a seventh valve land exposed to said governor pressure from said eighth port, and a second compression spring biasing said second valve spool in one direction to establish fluid communication between said sixth and seventh ports, said second valve spool being movable by the force of said second compression spring to establish fluid communication between said sixth and seventh ports when said governor pressure is below said first predetermined level indicating that the motor vehicle is at a standstill.

4. A line pressure modulating device as claimed in claim 3, in which said second control valve has a ninth port communicating with said manual selector valve to receive fluid under line pressure therefrom and a tenth port communicating with said sixth port of said first control valve, a third valve spool having an eighth valve land to control fluid communication between said ninth and tenth ports, and a third compression spring biasing said third valve spool in one direction to interrupt fluid communication between said ninth and tenth ports, said third valve spool engaging with said electric actuating means and being movable against the force of said third compression spring thereby in another direction to establish fluid communication between said ninth and tenth ports to transmit line pressure to said sixth port when said electric actuating means is energized.

5. A line pressure modulating device as claimed in claim 1, in which said electric actuating means is a solenoid.

6. A line pressure modulating device as claimed in claim 1, further comprising a kickdown valve which is interposed between said first and second control valves, and a second switch electrically connected to said electric actuating means in parallel with said first switch, said second switch being mechanically linked with said accelerator pedal and closing when said accelerator pedal is depressed beyond a second predetermined value, said kickdown valve communicating with said throttle valve and being exposed to throttle pressure therefrom, whereby when said throttle pressure exceeds a third predetermined value, said kickdown valve is actuated to transmit line pressure therefrom to cause a kickdown operation of the automatic transmission, and block fluid communication between said first and second control valves.

* * * * *